Figure 1:
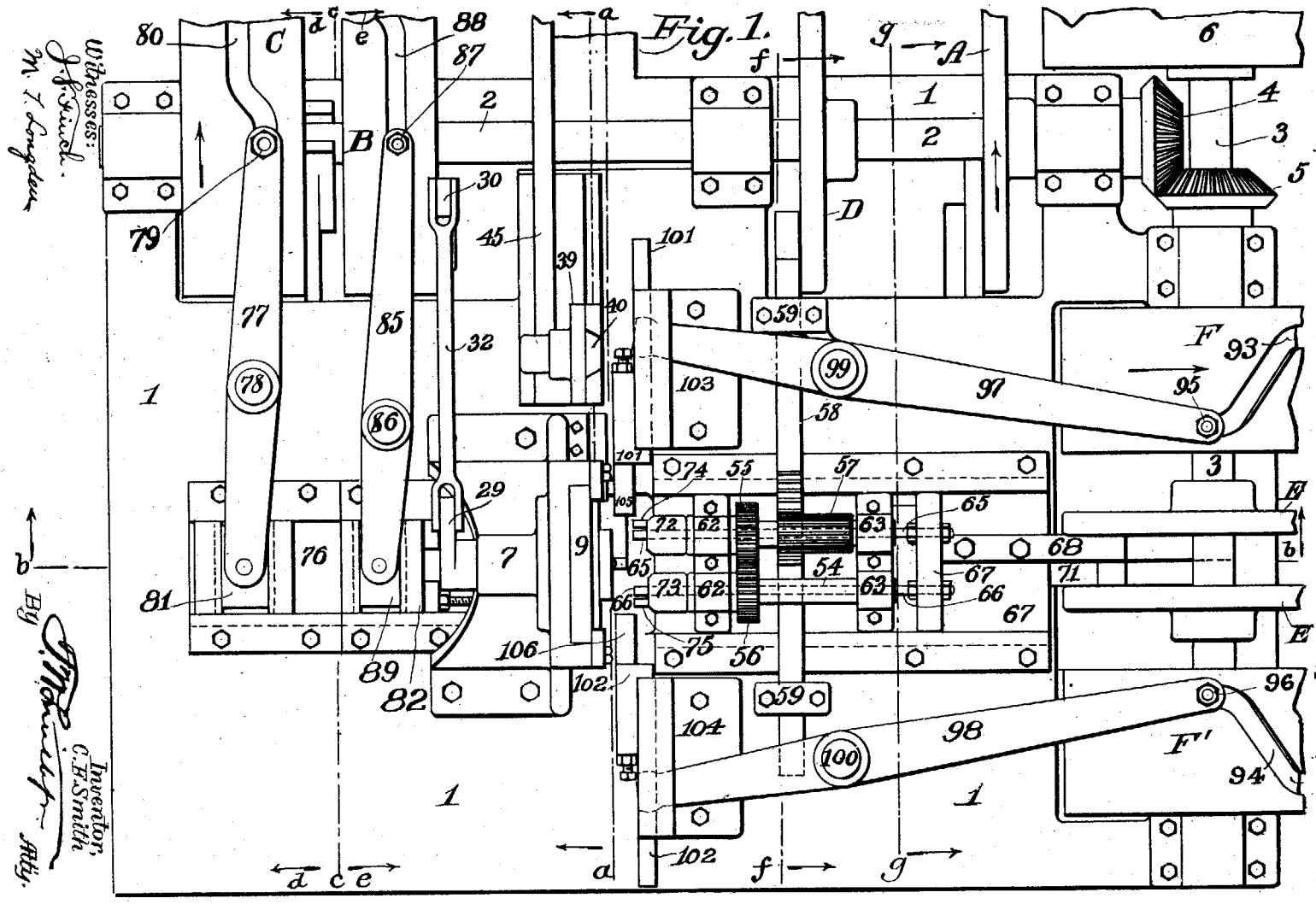

C. F. SMITH.

MACHINE FOR AUTOMATICALLY MAKING WIRE CHAIN.

No. 11,532. Reissued Apr. 14, 1896.

Witnesses:
J. S. Finch.
M. T. Longden

Inventor,
C. F. Smith
By T. Mowbray Atty.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

THE MORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. S. Finch.
M. T. Longden

Inventor,
C. F. Smith

By J. M. Smith Jr.
Atty.

THE NORRIS PETERS CO., WASHINGTON, D.C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. J. Finch
M. T. Longden

Inventor,
C. F. Smith
By T. M. Smith
Atty.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. F. Finch.
M. S. Longden

Inventor,
C. F. Smith
By T. M. Smith
Atty.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. J. Finch.
M. T. Longden.

Inventor,
C. F. Smith
By J. M. Smith
Atty.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. F. Finch.
M. T. Longden

Inventor,
C. F. Smith
By T. M. Smith Jr.
Att'y.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. J. Finch.
M. L. Longden

Inventor,
C. F. Smith
By T. M. Smith
Atty.

THE NORRIS PETERS CO., WASHINGTON, D.C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

Witnesses:
J. J. Kinch.
M. L. Longley

Inventor,
C. F. Smith
By J. M. Smith Atty.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D.C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D. C.

C. F. SMITH.

MACHINE FOR AUTOMATICALLY MAKING WIRE CHAIN.

No. 11,532. Reissued Apr. 14, 1896.

THE NORRIS PETERS CO., WASHINGTON, D.C.

C. F. SMITH.

MACHINE FOR AUTOMATICALLY MAKING WIRE CHAIN.

No. 11,532. Reissued Apr. 14, 1896.

Witnesses:
J. S. Finch.
M. T. Longden

Inventor,
C. F. Smith
By T. M. Smith
Att'y.

THE NORRIS PETERS CO., WASHINGTON, D.C.

UNITED STATES PATENT OFFICE.

CHARLES F. SMITH, OF BRIDGEPORT, CONNECTICUT, ASSIGNOR TO THE SMITH & EGGE MANUFACTURING COMPANY, OF SAME PLACE.

MACHINE FOR AUTOMATICALLY MAKING WIRE CHAIN.

SPECIFICATION forming part of Reissued Letters Patent No. 11,532, dated April 14, 1896.

Original No. 535,961, dated March 19, 1895. Application for reissue filed January 15, 1896. Serial No. 575,655.

*To all whom it may concern:*

Be it known that I, CHARLES F. SMITH, a citizen of the United States, residing at Bridgeport, in the county of Fairfield and State of Connecticut, have invented certain new and useful Improvements in Machines for Automatically Making Wire Chain; and I do hereby declare the following to be a full, clear, and exact description of the invention, such as will enable others skilled in the art to which it appertains to make and use the same.

My invention has reference to machines for automatically manufacturing chain from wire, but particularly relates to the manufacture of such chain composed of links bent to form a loop and an eye, the extreme ends of the wire being passed within the loop and then bent outwardly around the side wires to substantially encircle the same.

The main difficulty in machines constructed for the purpose of working wire lies in the fact that as a rule too much is required of parts at a single operation, it being true that a single part is usually called upon to perform at least a double function at a single operation. This is a very serious mistake, not only because too much work is thereby thrown upon a single element of the machine, but for the further reason that the parts thus overworked frequently fail to respond to their requirements, and the machine is therefore constantly undergoing repairs.

It is the object of my present invention to completely form the links of the chain by a series of separate bending operations, each one of which latter is performed by separate bending instrumentalities, whereby greater perfection is attained in the manufactured article, a larger output insured, and a great amount of expense saved.

There are seven bending operations performed by my machine in the manufacture of this chain, and in order that a better understanding of my invention may be arrived at I have herein shown and described in detail and in succession these several operations.

In order that those skilled in the art to which my invention appertains may more fully understand the nature and construction of the same and may obtain a better knowledge of the operation of my machine in the performance of the several bending operations above referred to, I will proceed to a detailed description thereof, reference being had to the accompanying drawings, which form a part of this specification, and in which—

Figure 2:
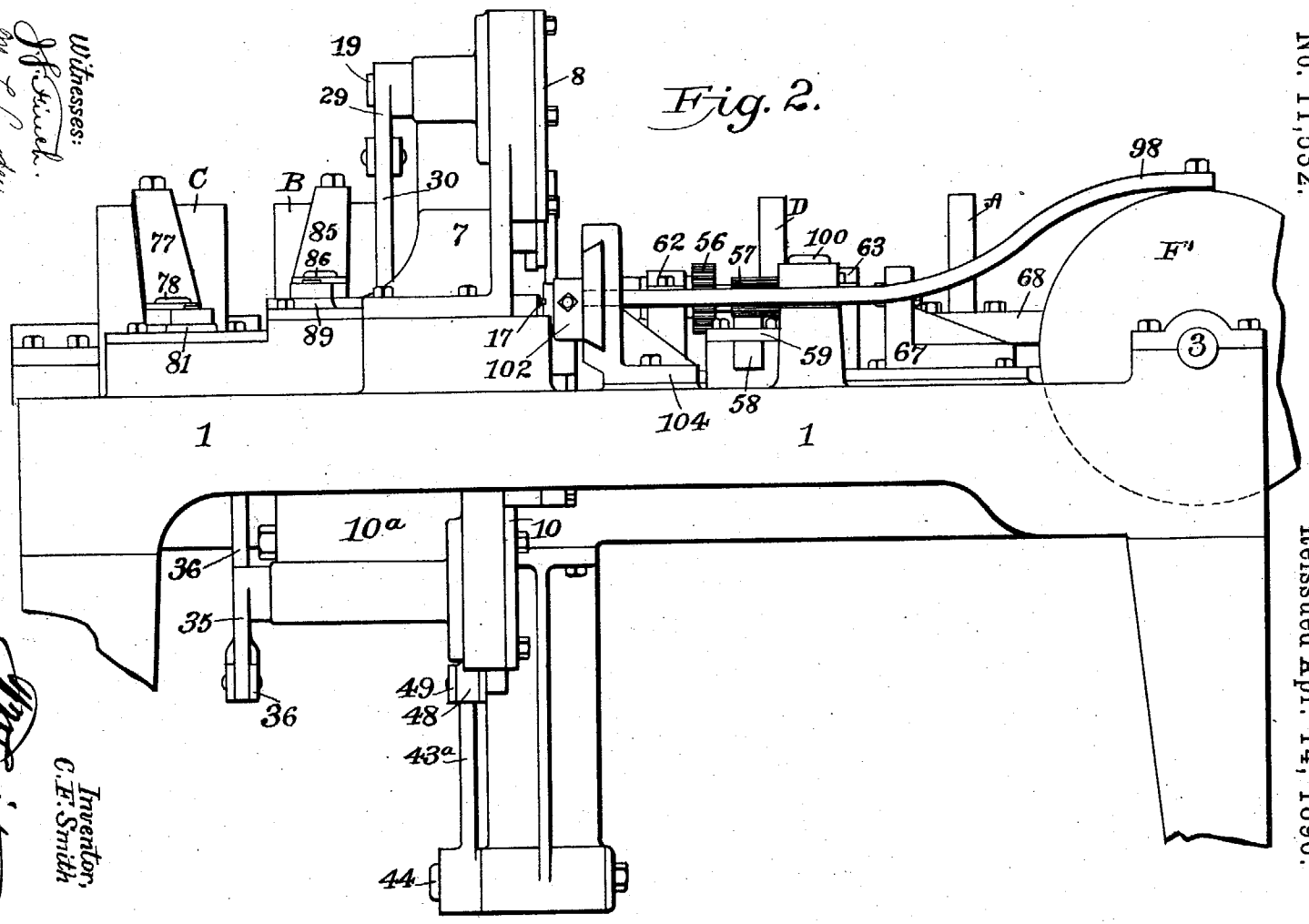
Figure 3:
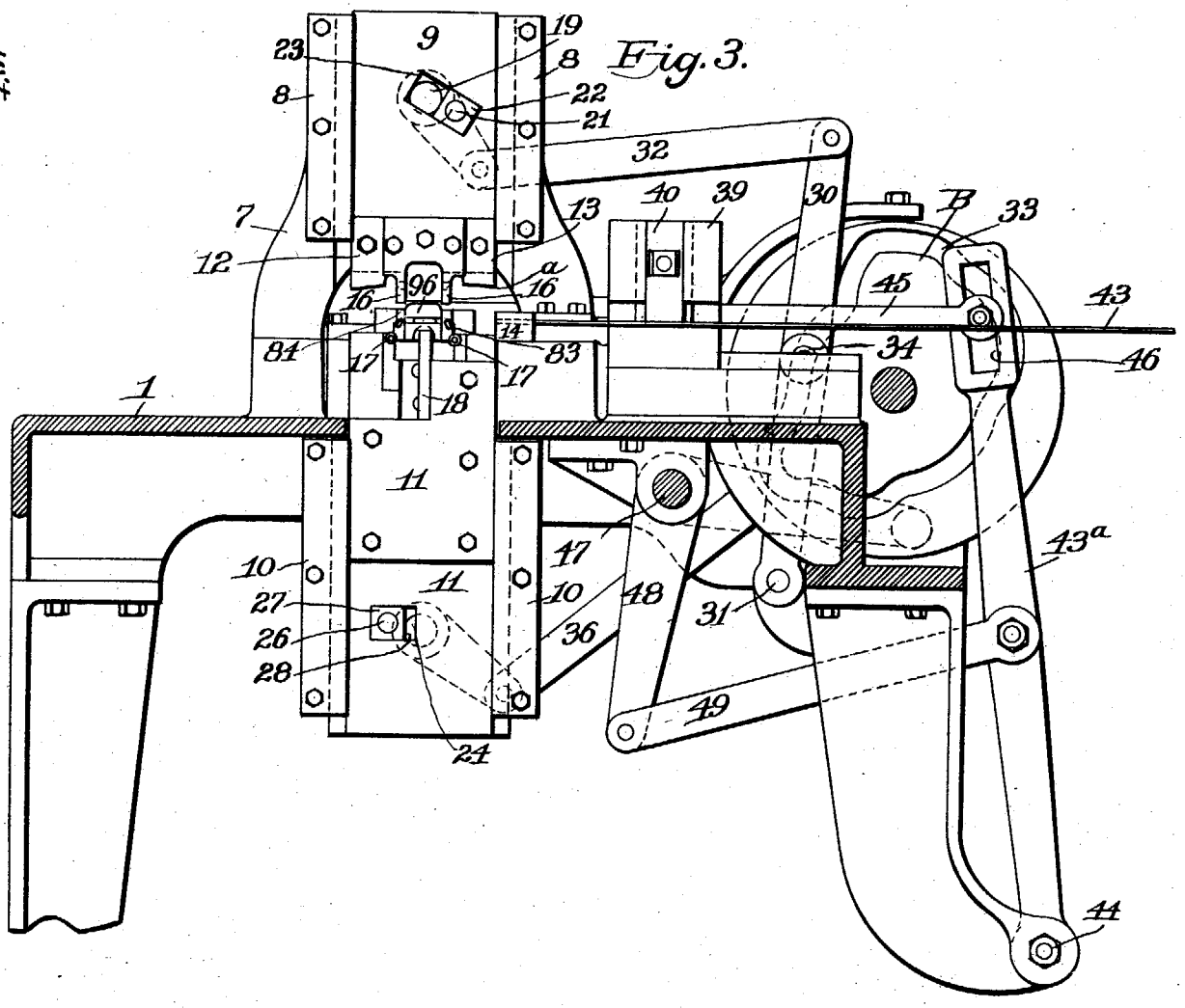
Figure 4:
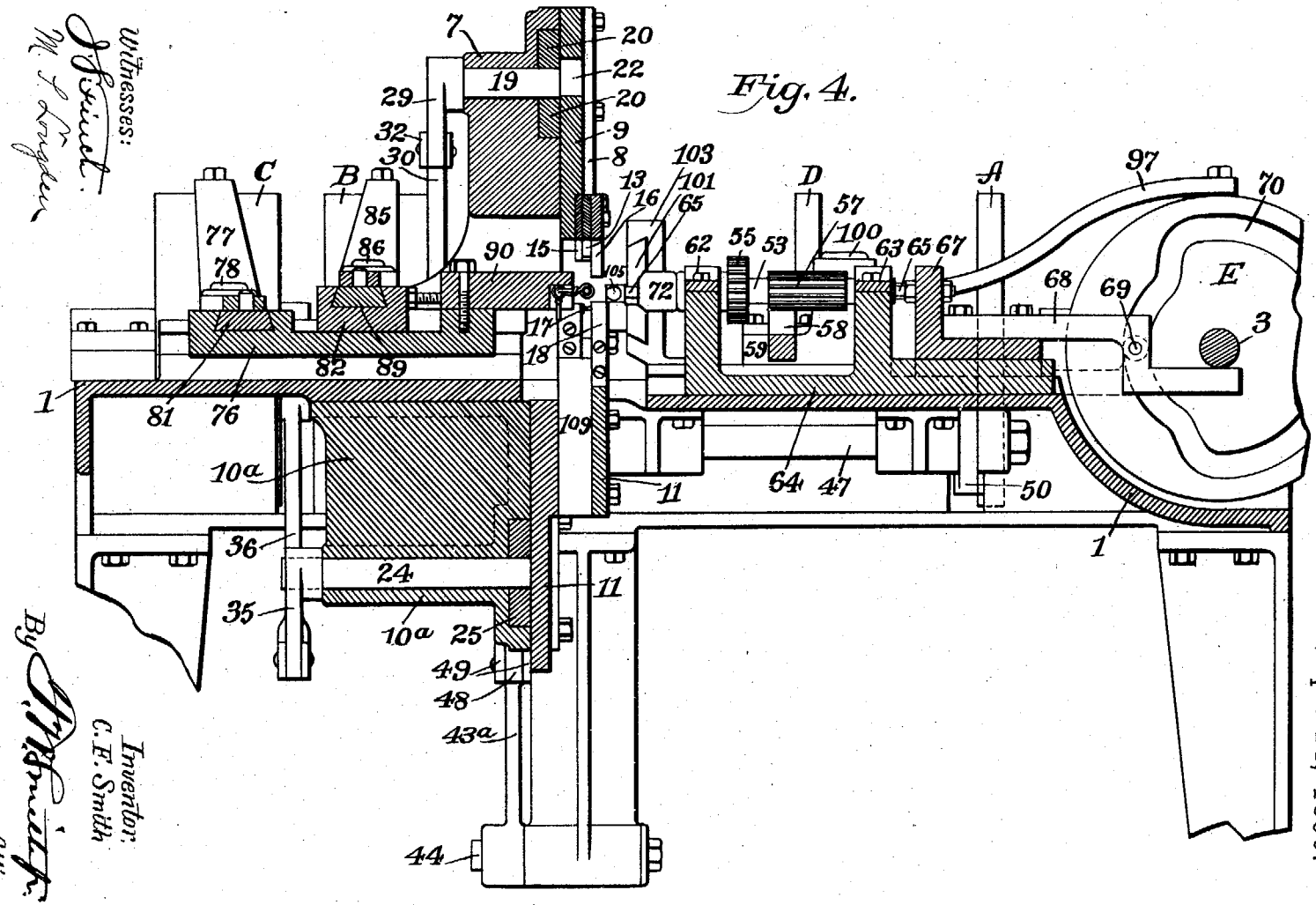
Figure 5:
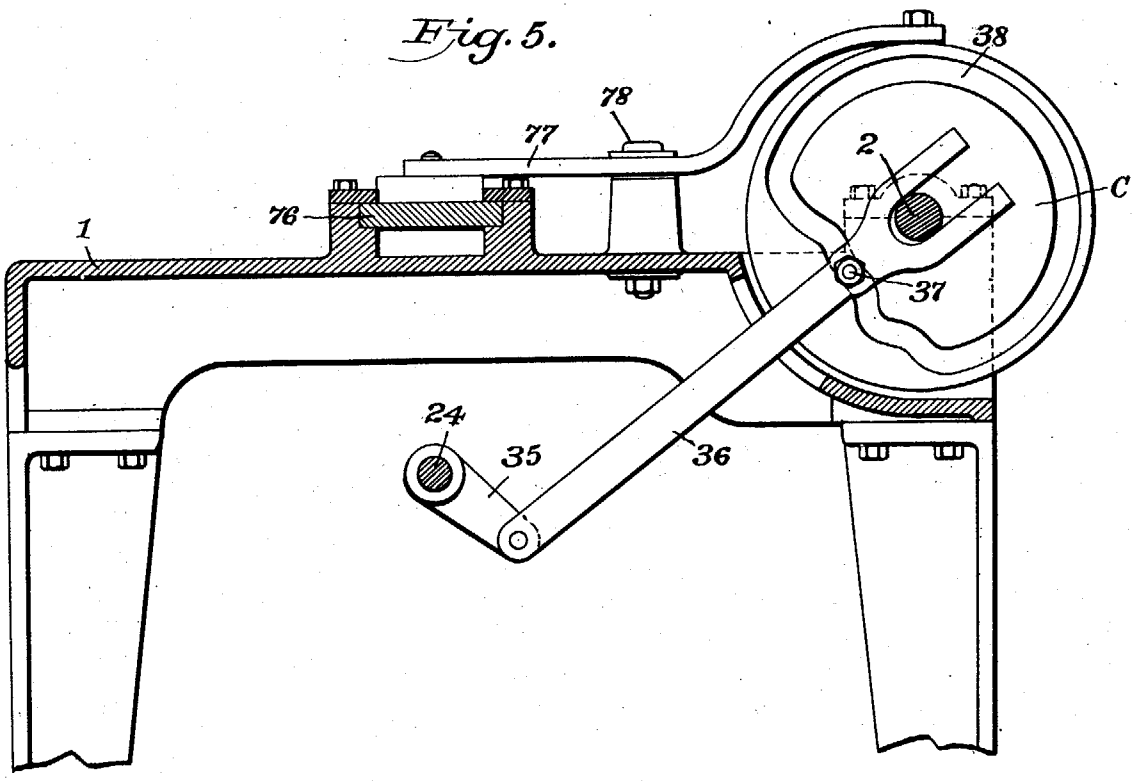
Figure 6:
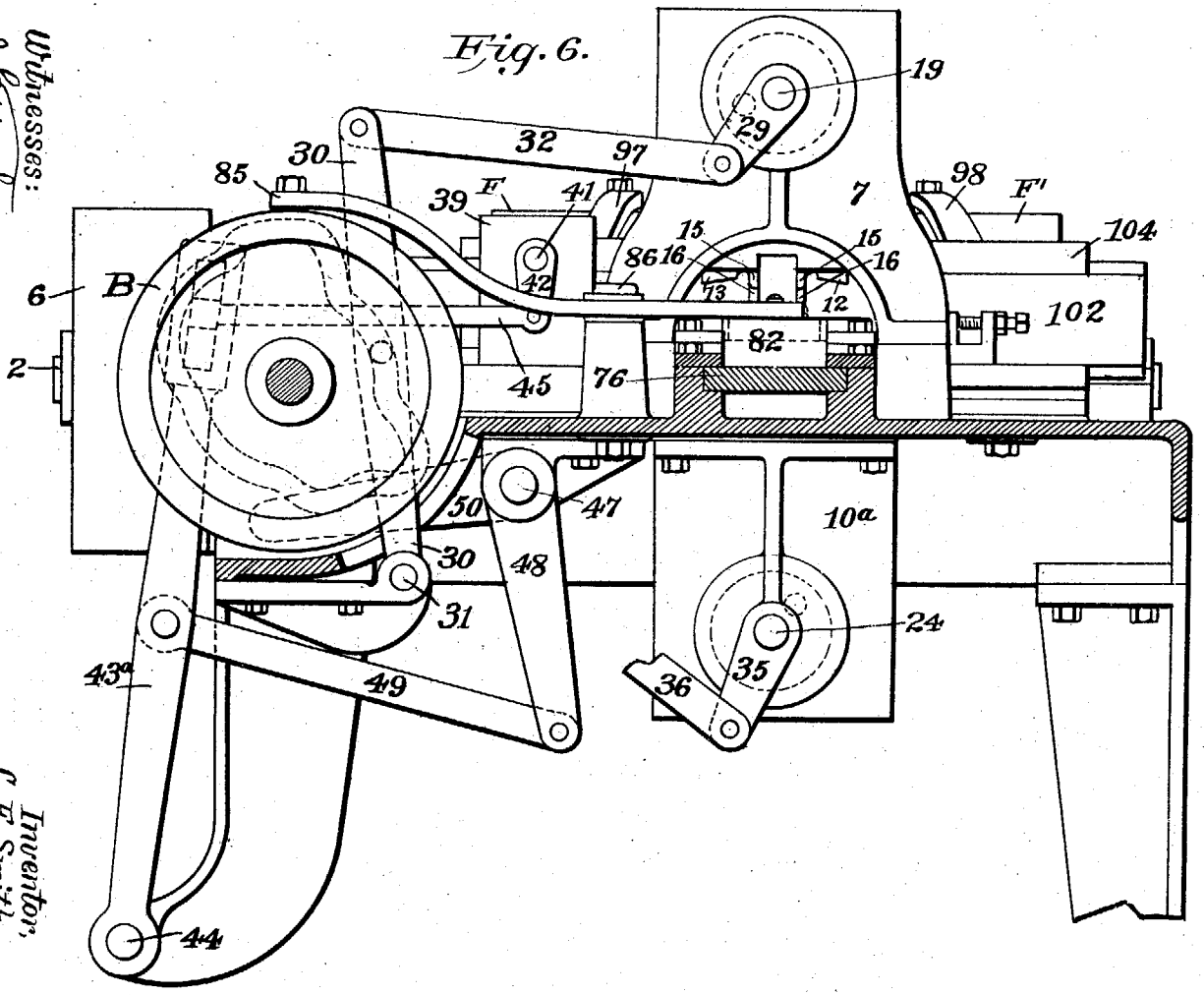
Figure 7:
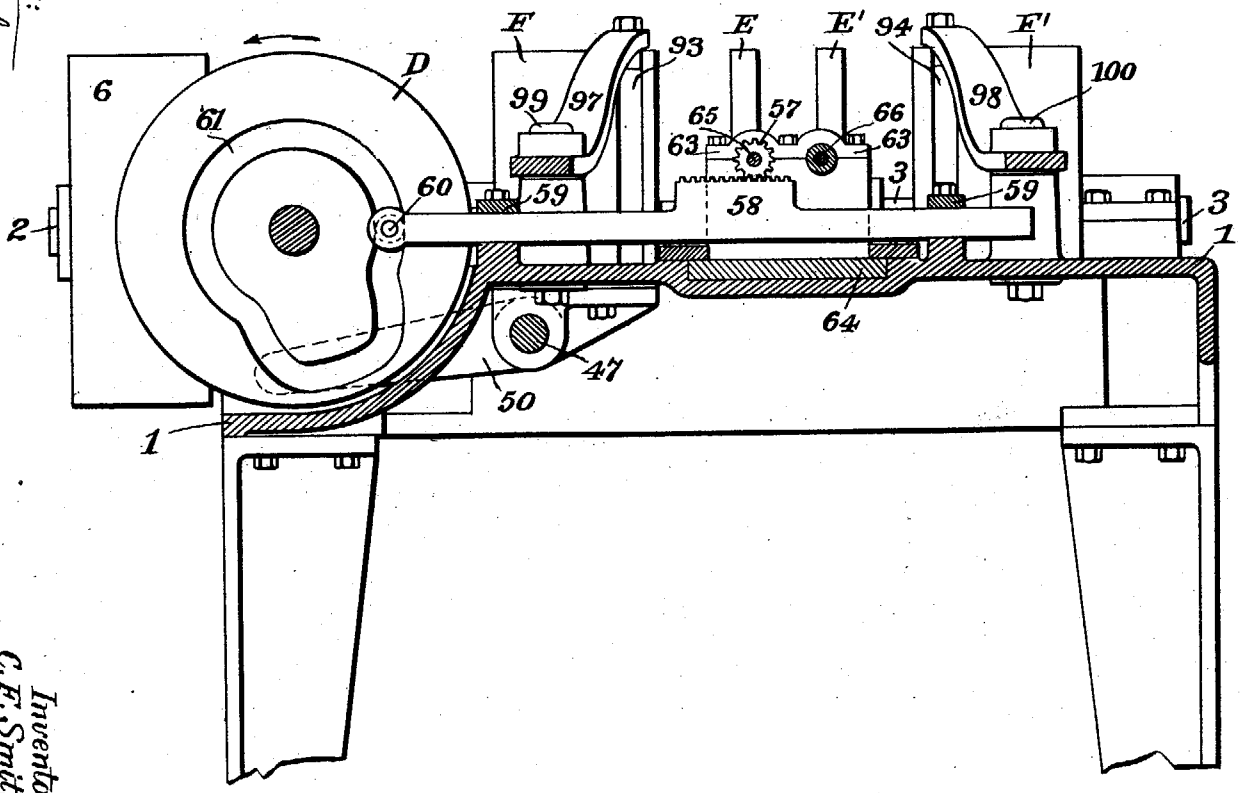
Figure 8:
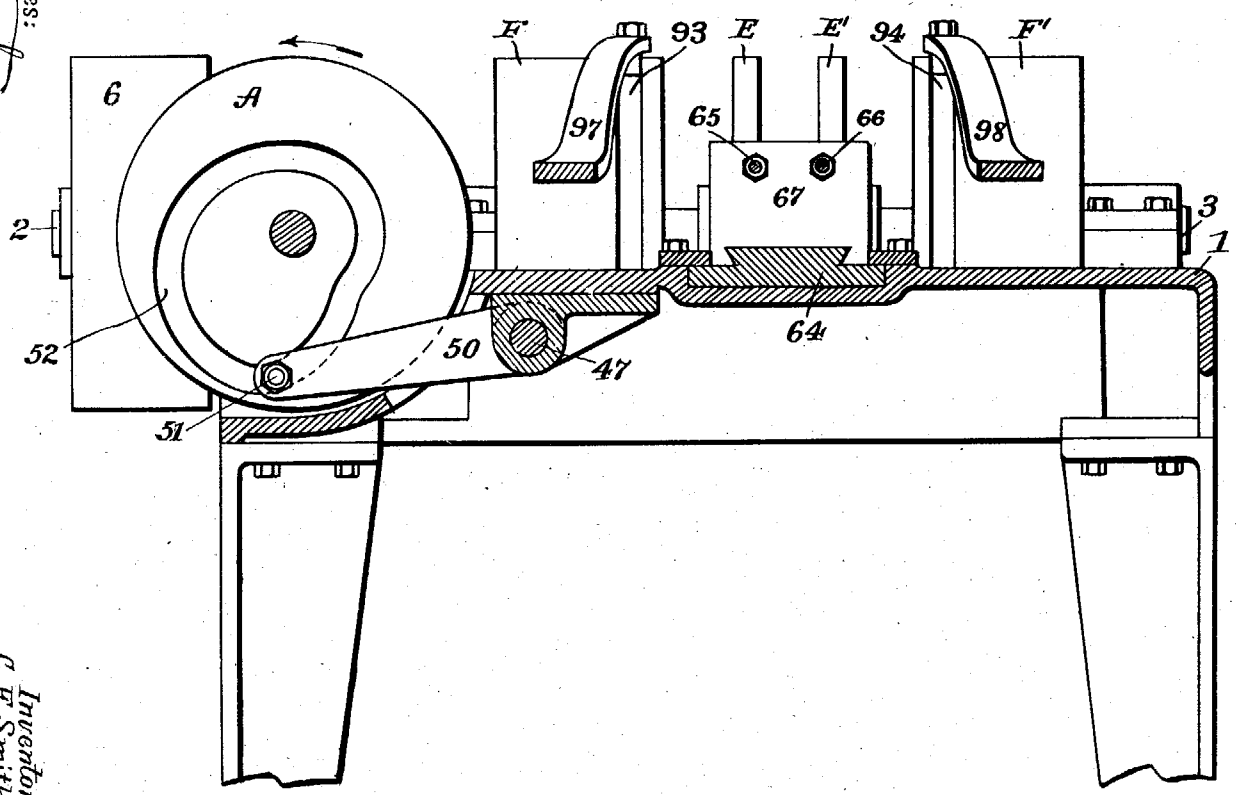
Figure 9:
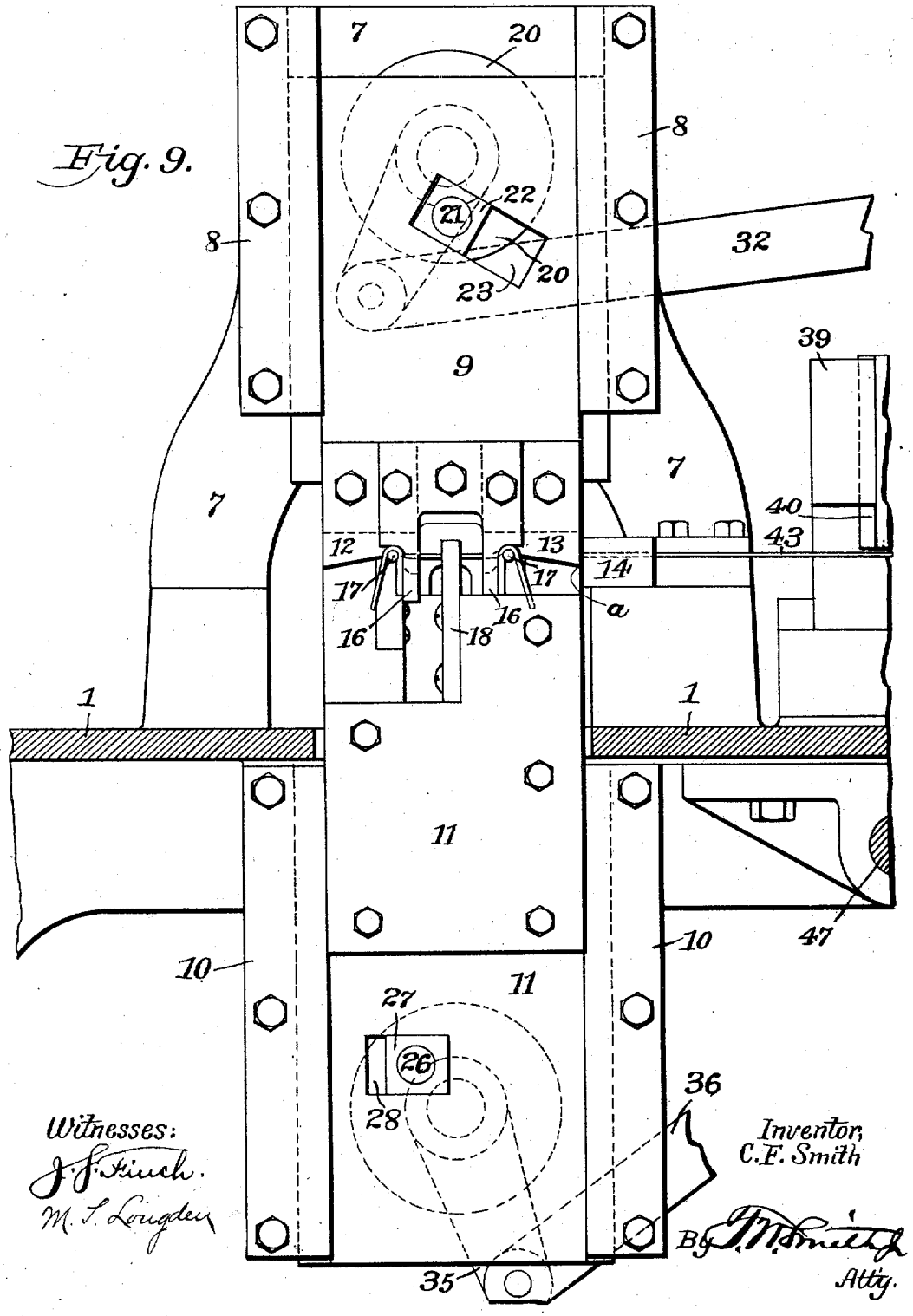
Figure 10:
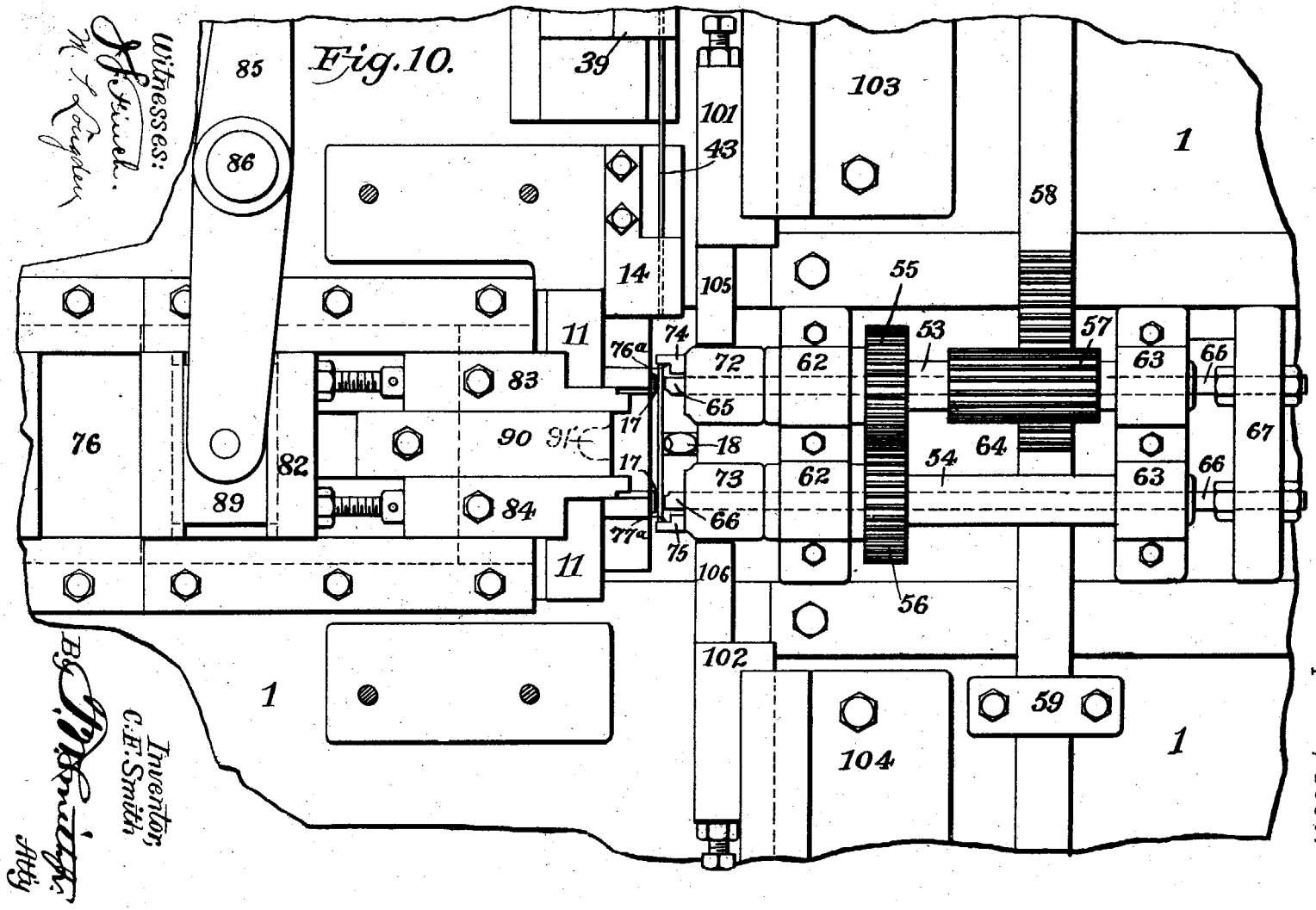
Figure 11:
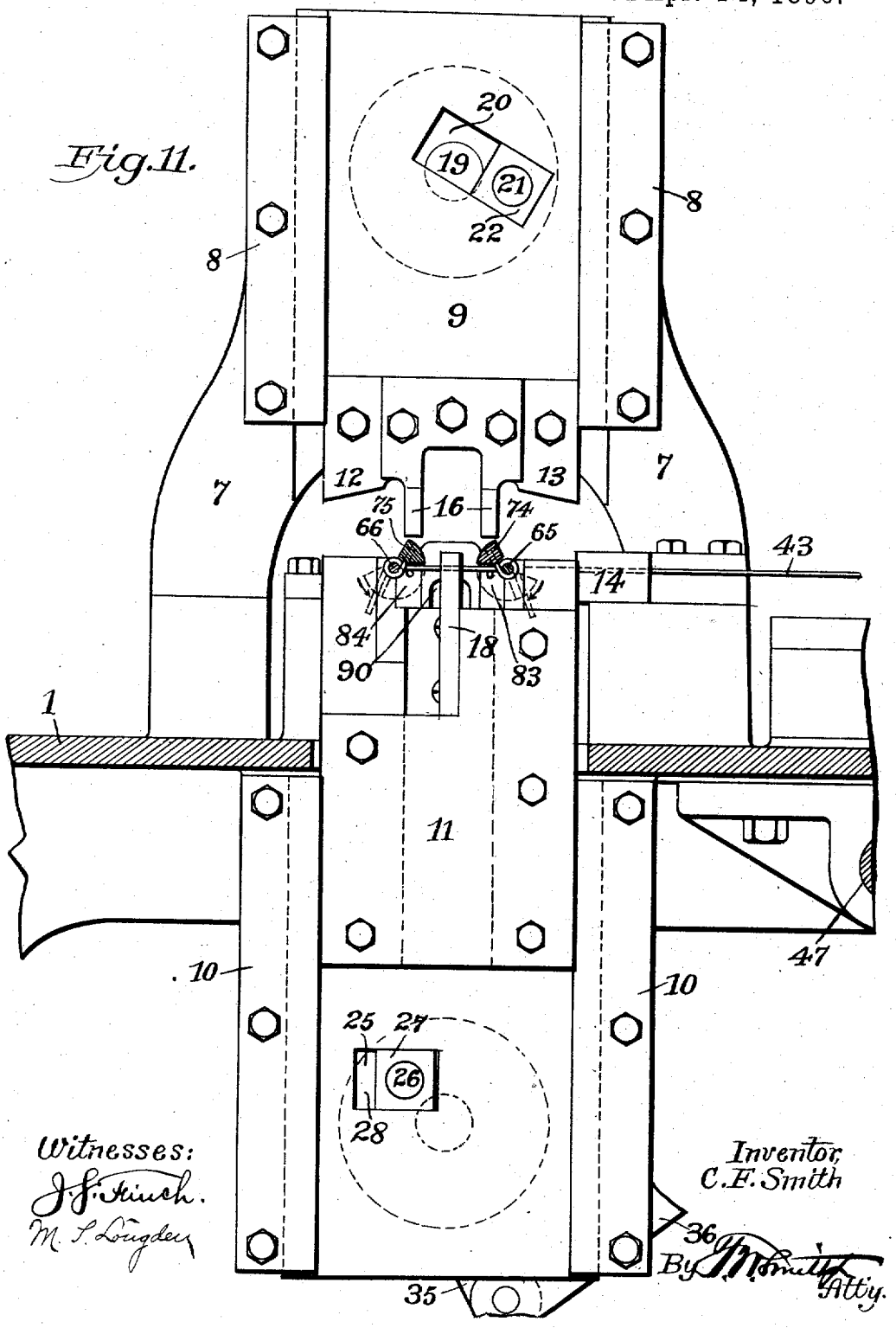
Figure 12:
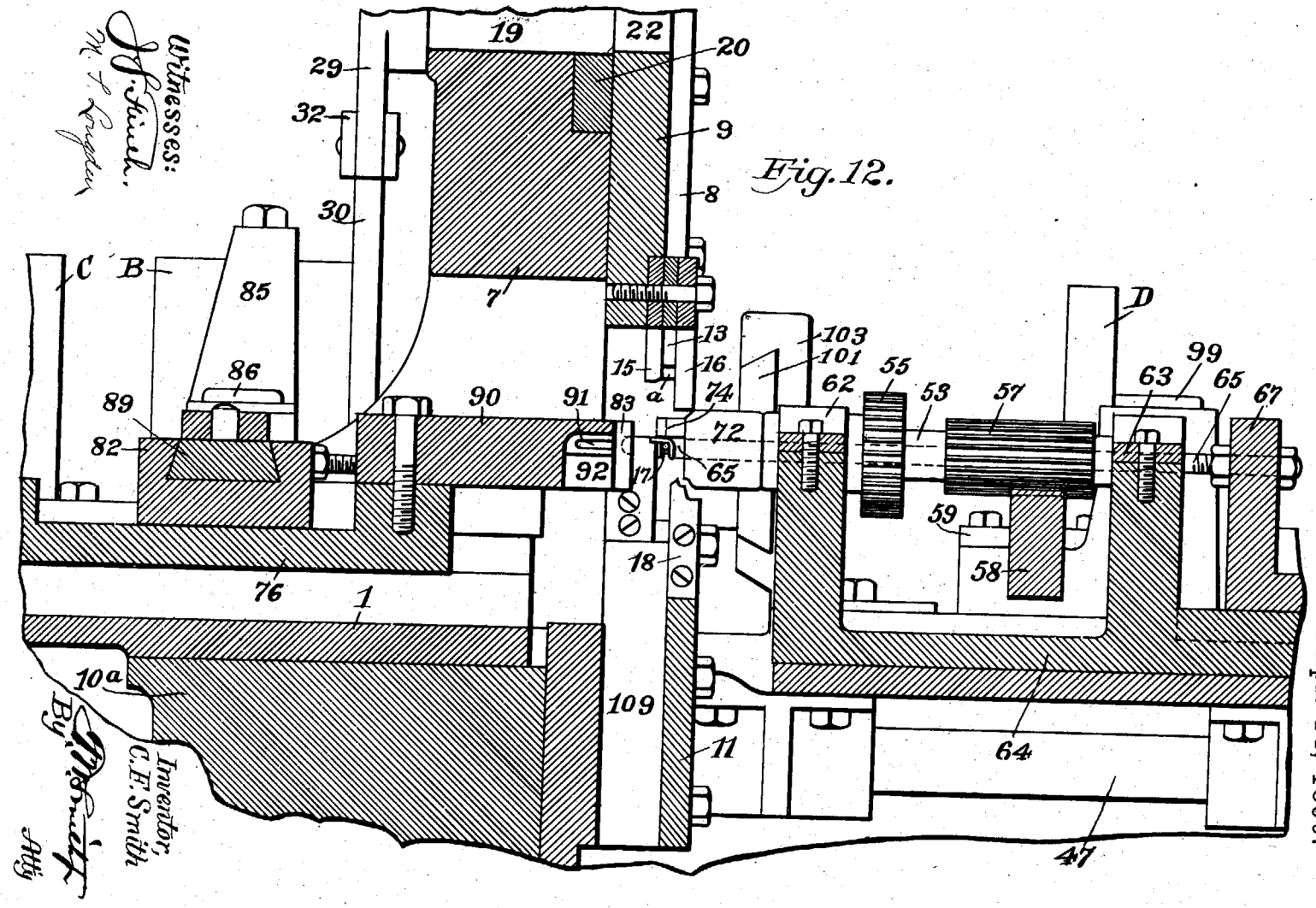
Figure 13:
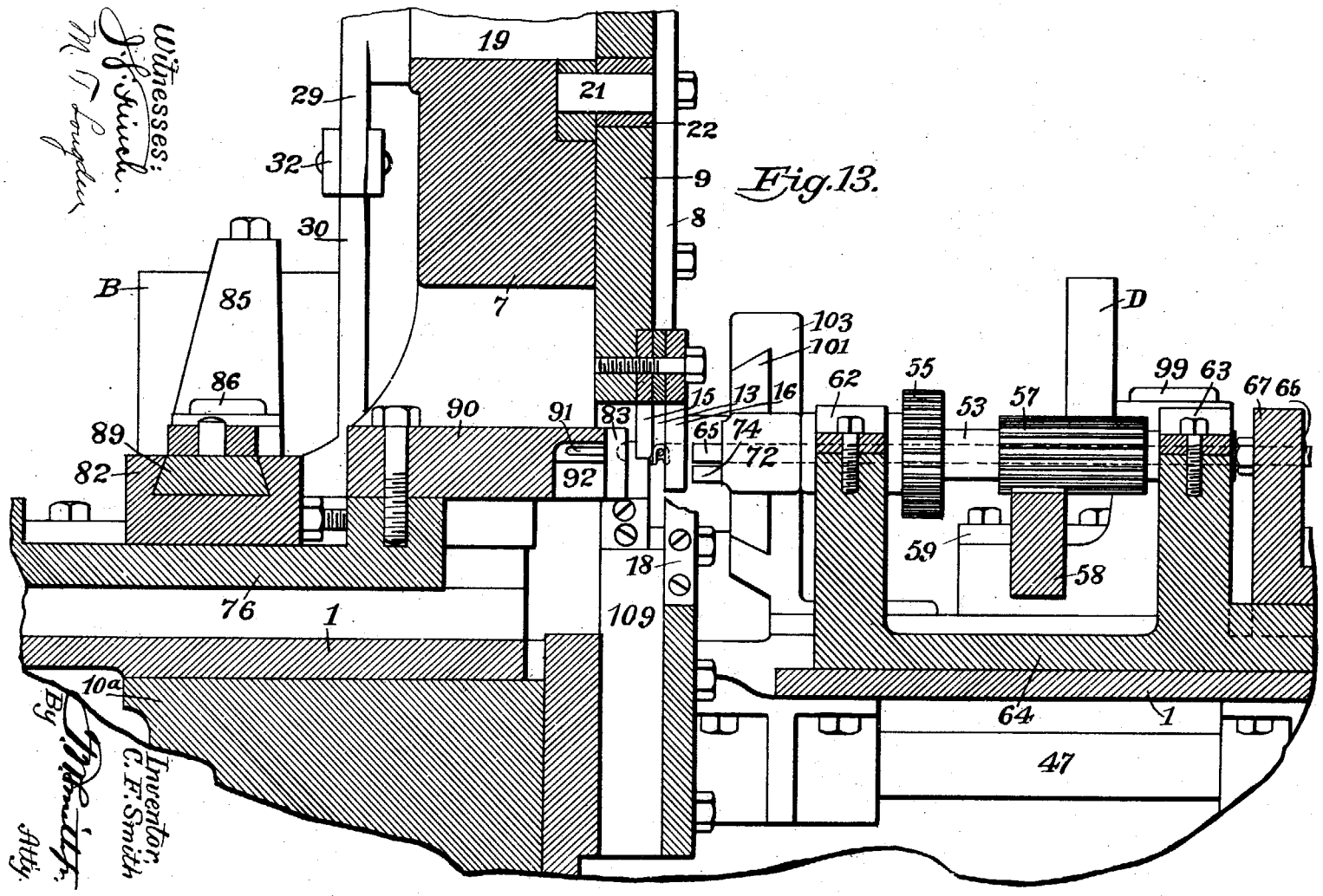
Figure 14:
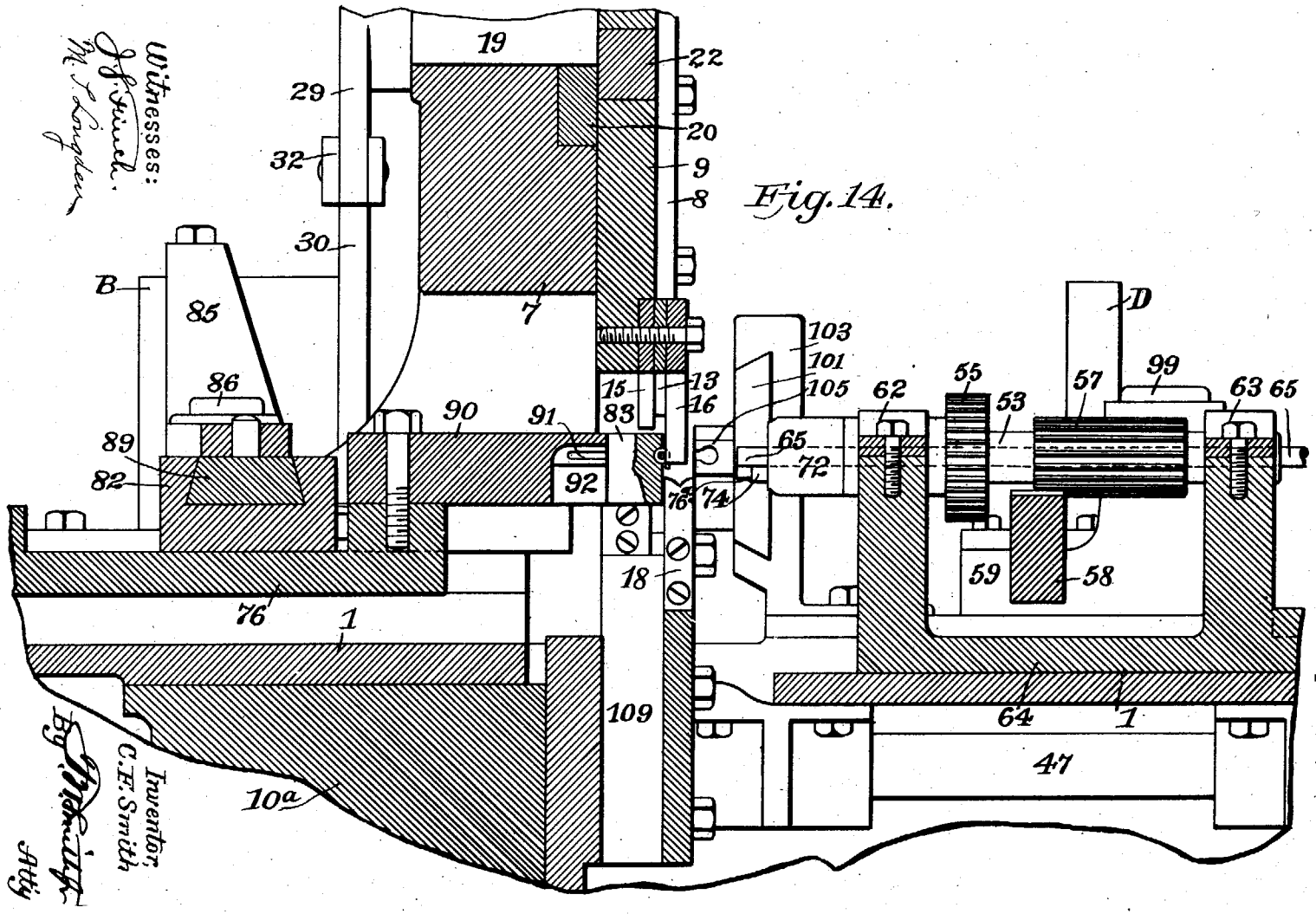
Figure 15:
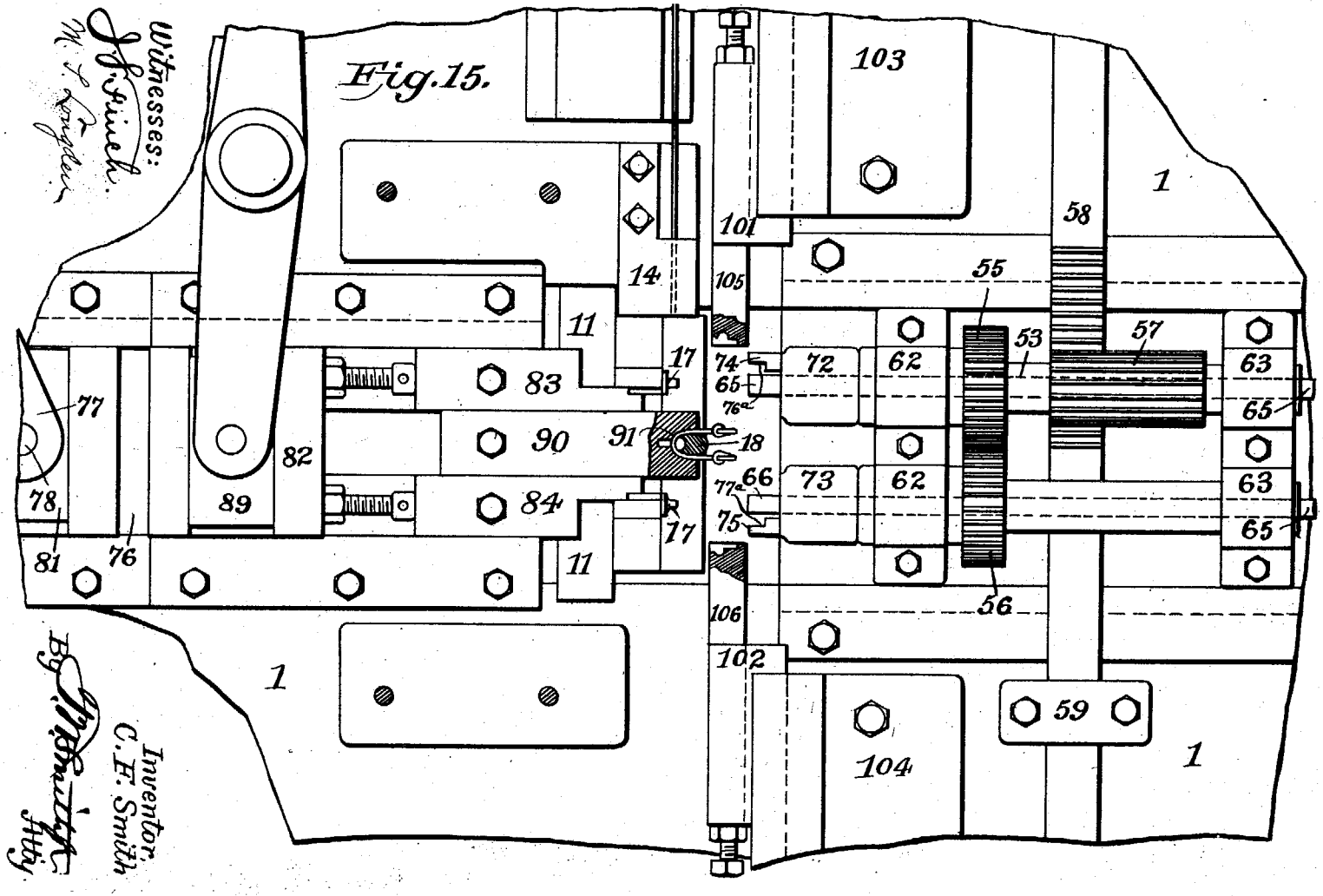
Figure 16:
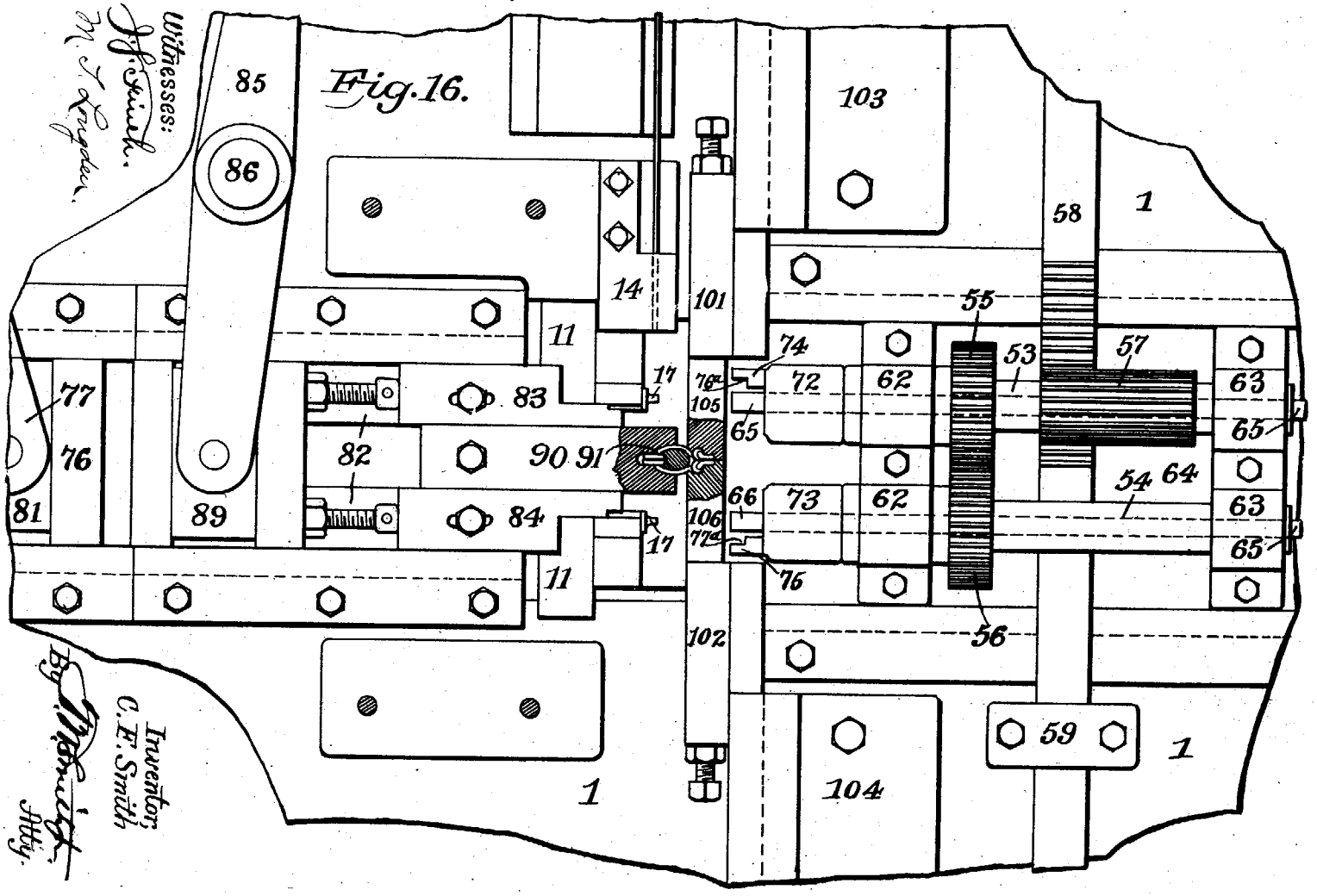

Figure 1 is a plan of a machine constructed in accordance with my improvement; Fig. 2, a front elevation; Fig. 3, a section at the line *a a* of Fig. 1; Fig. 4, a section at the line *b b* of Fig. 1; Fig. 5, a section at the line *c c* of Fig. 1, looking in the direction of the arrows *d*; Fig. 6, a section at the line *e e* of Fig. 1, looking in the direction of the arrows *e*; Fig. 7, a section at the line *f f* of Fig. 1; Fig. 8, a section at the line *g g* of Fig. 1. Fig. 9 is a sectional elevation similar to Fig. 3, on an enlarged scale, but showing the position of the parts after the first bending operation of the link has been performed. Fig. 10 is a plan view similar to Fig. 1, but showing the position which the parts assume after the bending operation shown at Fig. 9 has been performed and immediately prior to the second bending operation. Fig. 11 is similar to Fig. 9, with the exception that the parts are shown in the proper position after the second bending operation. Figs. 12, 13, and 14 are sectional elevations similar to Fig. 4, on an enlarged scale, but showing the positions which the parts assume, respectively, after the third, fourth, and fifth bending operations. Figs. 15 and 16 are detail broken plans, on an enlarged scale, similar to Fig. 1, but showing the position of the parts after the sixth and seventh bending operations, respectively. Figs. 17, 18, 19, 20, 21, 22, and 23 are detail perspective elevations illustrating the formation of the link gradually by the several bending operations above referred to.

Similar numbers and letters of reference denote like parts in the several figures of the drawings.

My improved machine comprises horizontal shafts journaled upon a stationary bed, and the several bending operations, in the formation of the link, are all performed in their proper order from cams which are carried by these shafts. These various cams are cut in such manner that the intermediate instrumentalities which perform the several bending operations operate successively and at predetermined times to perform their functions. After a link has been completely formed by the various bending operations the wire for a succeeding link is fed through the eyes of this previously bent and formed link and then cut off preparatory to being bent into the proper shape.

In describing my improved machine I will take up in order the several bending operations and will thereby follow the link through the machine in its manufacture, thus giving a clearer idea of my improvement than would be obtained if I explained the machine as a whole before identifying the manufacture in detail of the links. I have therefore separated the parts into groups of bending and forming instrumentalities, and in my description will especially refer to these groups in their order as to functions performed in the machine.

1 is the bed of the machine, having supported thereon in suitable journals the shafts 2 3, which latter are provided with intermeshing bevel-gears 4 5, respectively. The shaft 2 I will term the "main" shaft, the power being applied to the shaft 3 around the pulley 6.

Prior to the description of any of the bending instrumentalities I will describe the special construction of power-presses which are used by me as auxiliaries in all of the bending operations, and in this connection I would refer especially to Figs. 1, 2, 3, 4, 6, 9, and 11.

Mounted upon the bed is an upright 7, having guideways 8, within which a gate 9 is capable of sliding freely, and secured beneath this bed by bolts or otherwise is a hanger $10^a$, provided with guides 10, within which a gate 11 is capable of a free sliding movement. These two guideways 8 10 are in the same vertical plane, and the gates can be carried toward or away from each other for the purpose of coöperating in the manner presently to be explained. The upper gate 9 carries bending-tools 12 13, which assist to perform the first bending operation, the tool 13 being formed with a cutting edge *a* at its side, which coöperates with a stationary block 14, through which the wire is fed to cut off the wire into predetermined lengths. Carried also by this upper gate are the bending-tools 15, which perform the fourth bending operation, and anvils 16, which support the wire during the fifth bending operation. The lower gate carries studs 17, around which the ends of the wire are bent, these studs acting as supports for the wire during the entire formation of the link, with the exception of the sixth and seventh bending operations. Also carried by the lower gate is the mandrel 18, around which the wire blanks are bent into U shape and then finally formed.

Journaled within the upright 7 is a short rock-shaft 19, having tightly secured on its inner end a disk 20, which latter is provided with a crank-stud 21, which extends loosely through a block 22, capable of a free sliding movement within a slot 23 in the gate 9. It will be readily understood that when this shaft 19 is rocked back and forth the gate 9 will be elevated and lowered, the slot 23 providing for the sliding of the block 22 during the swinging movements of the stud 21.

Journaled within the hanger $10^a$ is a rock-shaft 24, having secured at its inner end a disk 25, provided with a crank-stud 26, which projects loosely within a block 27, the latter being capable of a free sliding movement within a slot 28 in the lower gate 11, these arrangements and connections between the rock-shafts 19 24 and gates 9 11 being substantially the same, the object in both instances being merely to reciprocate the gates in a vertical plane during the rocking movements of the shafts. In the instance of the upper gate the slot is deflected in order to allow for a greater throw of this gate. The movement of the lower gate being considerably less, the slot is simply horizontally disposed. These shafts 19 24 are rocked by substantially similar means, which latter I will now describe.

29 is a crank secured on the rear end of the shaft 19, and 30 is a lever pivoted at its lower end at 31 to the frame of the machine, its upper end being connected to said crank by means of a link 32, so that it will be readily understood that any rocking movements of the lever 30 will be communicated to the crank 29, B is a cam mounted on the shaft 2 and having in its side a peculiarly-shaped groove 33, within which extends a roller 34, journaled on the lever 30. It is not deemed necessary to enter into any detail description as to the layout and general outline of this groove in the cam B, since it is considered sufficient merely to state that said groove is such that as the cam revolves an intermittent and variable movement will be imparted to the lever 30 for the purpose of causing the upper gate to operate in the proper time for the performance of its functions.

Secured on the rear end of the shaft 24 is a crank 35, and pivoted to this crank is a lever 36, whose free end is forked and extends around the shaft 2, said lever being provided with a roller 37, which extends within a suitably shaped and outlined groove 38 in the cam C, mounted on the shaft 2, so that it will be readily understood that as this cam revolves a reciprocatory rocking movement will be imparted to the crank 35 for the purpose of elevating and lowering the gate 11.

For reasons similar to those above stated with respect to the cam B it is not deemed necessary to describe in detail the general outline of the groove 38 in the cam C, and the same is true of the operative contours of all the cams hereinafter to be mentioned, it being considered sufficient for the purposes of this description to assume that the cams are properly cut to effect the various operations required in the proper times.

39 is a head-block capable of sliding in horizontally-disposed ways on the bed 1 and provided with vertical guideways within which a bar 40 is capable of sliding freely. Journaled within the back of this block 39 is a rock-shaft 41, (see Fig. 6,) which is operatively connected at its front end to the bar 40 in precisely the same manner as in the instance of the shafts 19 24 and gates 9 11, and it is therefore not deemed necessary to repeat this description. Secured to the rear end of this shaft 41 is a crank 42, and it will be readily understood that by the reciprocation of this crank the bar 40 is lowered or elevated, as the case may be. The wire 43, as it is fed into the machine to the bending devices, is supported upon the base of this block 39, and it will therefore be clear that when the bar 40 is depressed it will clamp the wire firmly against the base of the block.

43ª is a lever pivoted at 44 to the frame of the machine, and to the upper end of this lever the crank 42 is connected by means of a link 45. This link is pivoted at one end to the crank 42, the other end of the link being pivoted to the lever 43ª within an elongated slot 46 in the latter for the obvious purpose of allowing said lever to swing from its pivotal point without any binding at the point of its connection with the link 45.

47 is a rock-shaft journaled in the frame of the machine beneath the bed and having secured thereon the crank 48, and 49 is a link whose ends are pivoted to said crank and to the lever 43ª, whereby any movement from the rock-shaft 47 will be communicated to said lever.

Referring particularly to Fig. 8, 50 is a crank secured on the shaft 47 and carrying at its extremity a roll 51, which projects within the groove 52 in the cam A, the revolution of the latter causing said crank to be reciprocated, so as to rock the shaft 47. When the shaft 47 is rocked in such manner as to throw the lever 43ª inward, the bar 40 will be bound firmly against the wire, and the continued movement of such lever, after the wire is thus clamped, will cause the block 39 to be moved inwardly along the ways in the bed, thereby carrying the wire bodily with it. The inward sliding movement of this block is, of course, governed by the cam-groove 52, and the latter is such that said block will be carried inward to the extent sufficient to always feed a predetermined length of wire within the field of operation of the bending devices. When this cam A causes the lever 43ª to be thrown backward, the crank 42 will thereby be operated to elevate the bar 40, so that the block 39 may move backward without carrying the wire with it. The extent of this backward movement of the block 39 is, of course, such that when the lever 43ª is again operated to cause the bar 40 to grip the wire only enough of the latter will be fed forward to enable a link to be formed, so that it will be clear that the operation of this feeding device is intermittent and that a predetermined length of wire is fed at each inward movement of the block 39.

I will now describe the means whereby the first bending operation in the manufacture of a wire link by my machine is performed.

By the action of the block 39 the wire is fed between the two gates 9 11, the parts being in the position as shown at Fig. 3. The block now recedes and the cams B C operate to cause the upper and lower gates to be moved toward each other, whereby the tools 12 13 will be carried downward to an extent sufficient only to enable the tool 13 to cut off the blank, at which point said tools come to a state of rest without having effected any bends in the wire, while the upward movement of the lower gate causes the studs 17 to be thrown against the wire blank, thereby forcing the end portions of the latter up within the tools 12 13, so as to form a half-round, the extreme ends of the blank being thus bent downward, as clearly shown at Fig. 9. The gate 9 is now elevated prior to the next operation of the bending devices.

Referring particularly to Figs. 1, 7, 10, and 11, I will now enter into a description of the instrumentalities and the operation thereof for the purpose of effecting the second bending operation. Journaled in boxes presently to be described are shafts 53 54, having tightly mounted thereon intermeshing spur-pinions 55 56, whereby said shafts may revolve simultaneously but in opposite directions. Also secured on the shaft 53 is an elongated pinion 57, which meshes with a rack-bar 58 capable of sliding freely within suitable boxes 59, secured to the bed 1. The rear extremity of this rack-bar is provided with a roll 60, which projects within a groove 61 in the cam D, mounted on the shaft 2, the nature of this groove being such that when the cam is revolved the rack-bar will be thrown forward and backward, whereby reciprocatory rotary movements will be imparted to the shafts 53 54. The boxes within which the shafts 53 54 are journaled comprise upward projections 62 63 from a slide 64 capable of a free movement within suitable ways in the bed, this sliding movement and consequent carrying of the shafts 53 54 bodily to and fro causing no disarrangement of parts nor in any way affecting the communication of the proper movements to these shafts, owing to the fact that the pinion 57 is elongated and is therefore always in engagement with the rack-bar 58. These shafts 53 54 are hollow and have extending therethrough clamp-rods 65 66, which latter are capable of sliding freely therein and are secured at their rear ends to an angle-block 67, which latter is adapted to slide freely on suitable ways in the slide 64, as will be clearly seen by reference to Figs. 4 and 8. It will thus be seen that the shafts 53 54 and the clamp-rods 65 66 are capable of independent sliding movements. Bolted to the block 67 is a lever 68, provided with a roll 69, which projects within a groove 70 in the cam E, which latter is mounted on the shaft 3, the tail end of this lever extending beneath said shaft for the purpose of steadying the lever. Secured to the slide 64 is a similar lever 71, which is likewise provided with a roll which projects within a groove in the cam E′, mounted on the shaft 3, this last-mentioned roll and groove being shown in dotted lines at Fig. 1. The revolution of the cams E E′ will cause the slides 64 67 and the parts carried thereby to be moved forward and backward, the action of these cams being, of course, independent of each other.

Secured on the front ends of the shafts 53 54 are heads 72 73, and projecting eccentrically from the front faces of these heads and at the outer portions thereof are the tools 74 75, which perform the second and third bending operations. These tools are secured in any suitable manner to the heads which carry them, and they are notched, as seen at 76ᵃ 77ᵃ, the notched portions having as their sole function the performance of the third bending operation. The upper gate 9, having been elevated after the first bending operation, as above set forth, the rotation of the cams E E′ will cause the clamping-rods 65 66 to be carried forward against the studs 17, so as to hold the partially-formed blank securely, while at the same time the tools 74 75 will be carried beyond the ends of the wire blank, all of which will be readily understood by reference to Fig. 10, wherein the several parts are shown in their proper relative positions immediately prior to the second bending operation. The timing of the cam D is such that the rack-bar will now be thrown forward, thus causing the heads 72 73 to be revolved in opposite directions and forcing the tools 74 75, owing to the eccentricity of their arrangement, against the ends of the wire blank and curling said ends around the studs to initially form the eyes of the link, as clearly shown at Figs. 11 and 18, the extremities of the wire being now in the same plane with the eyes. The action of this cam D is such that the reciprocation of the heads 72 73 extends only throughout a half-revolution of the shafts 53 54, the arc through which the bending-tools are thus carried being clearly denoted at Fig. 11. In order to perform the third bending operation, the cam E′ now operates to throw the heads 72 73 forward, thus forcing the bending-tools 74 75, at the bases of their notched portions, against the extremities of the wire, so as to bend them across the straight portion of the wire, or, in other words, to a position at right angles to the plane of the eyes, as clearly shown at Figs. 12 and 19. It will thus be understood that these bending-tools 74 75 will, when carried in the arc of a circle, curl the ends of the wire around the studs to form the eyes, and when projected forward will force said ends across the bases of the eyes at right angles thereto. The clamping-rods 65 66 will be held by the cam E against the studs to keep the wire in position through the performance of the second and third bending operations, and the cam D will cause no movement of the rack-bar 58 during the third bending operation, so that at that time the bending-tools 74 75 will have no rotation. The cams E E′ now operate to withdraw the heads 72 73 as well as the clamping-rods 65 66. By this time the cam B will operate to lower the gate 9, and the bending-tools 15, carried thereby, will be forced against the projecting ends of wire (see Fig. 12) and will bend the said ends still farther around the body of the wire and in a plane at right angles to that assumed by these ends after the third bending operation, thus completing the fourth bending operation, as will be clear by reference to Figs. 13 and 20.

From the foregoing description it will be understood that up to the time of completing the fourth bending operation the ends of the wire will have been bent three-fourths of the distance around the body of the wire at the bases of the eyes, and the bending operation next to be described gives the final bend to the ends of the wire, so that said ends will entirely encircle the body of the wire.

76 is a slide capable of free movement within suitable ways in the bed, movement being imparted to this slide by a lever 77, pivoted at 78 to the bed; the rear end of said lever carrying a roll 79, which projects within a groove 80 in the circumference of the cam C, while the forward end of this lever is pivoted to a shoe 81, the latter capable of a free movement in suitable guideways in said slide. As the lever 77 is horizontally reciprocated by the cam C a forward-and-backward sliding movement will thereby be given to the slide 76, for the purpose presently explained.

Guided within suitable ways in the main slide 76 is a sliding block 82, to the floor of which at the forward end are bolted the tools 83 84 for performing the fifth bending operation. The sliding block 82 has its movements entirely independent of the main slide 76, and movements are imparted to said block by means of a lever 85, pivoted at 86 to the bed of the machine, the rear end of this lever carrying a roll 87, which projects within a groove 88 in the cam B, the forward end of this lever being pivoted to a shoe 89, which has a free movement within suitable ways in said block.

In performing the fifth bending operation the gate 9 is caused to dwell throughout this operation by the action of the cam B, so that the anvils depending from said gate will stand in front of the studs 17 and remain in that position throughout said operation. The cam B now operates to throw the block 82 inward, thereby forcing the bending-tools 83 84 against the ends of the wire, so as to finally curl said ends to completely encircle the body of the wire at the bases of the eyes, as clearly shown at Figs. 14 and 21. The extremities of these bending-tools which perform this operation are of course formed so as to adapt themselves to the contour of the finally-curled extremites of the wire, and the presence of the anvils 16 affords a firm backing for the operation of these tools.

Figure 22:
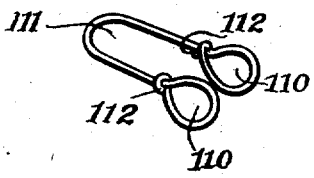

It now becomes necessary to bend the blank into U shape, in order that the finally formed and completed eyes may be brought side by side in coincidence and the loop of the link formed. The sixth bending operation relates to the bending of the blank into U shape, and I will now describe the means whereby this is accomplished. Prior to this sixth bending operation the cam B operates to both cause the withdrawal of the tools 83 84, and also to elevate the gate 9, so that the parts carried thereby will be raised to their uppermost position and out of the way of the means which I employ for bending the blank into U shape. Secured to the forward extremity of the slide 76 is the tool 90, which performs the sixth bending operation, said tool at its forward extremity having a horizontally-disposed recess 91, within which the body of the link is received and bent around the mandrel 18, and being cut away at the bottom portion, as shown at 92, for the double purpose of accommodating the mandrel and for permitting the passage of the interlooped chain links as fast as they are formed and completed. After the tools 83 84 have accomplished their function the cam B acts to withdraw these tools, whereupon the cam C causes the slide 76 to be thrown inwardly, thereby forcing the tool 90 against the body portion of the wire blank and removing the latter from the studs 17 and bending it around the mandrel 18, as shown at Figs. 15 and 22.

It will of course be understood that the lower gate 11 will, during this last-described operation, be sustained in elevated position by the action of the cam C in connection with the lever 36, as hereinbefore set forth, in order that the mandrel 18 may be in proper position to coöperate with the tool 90 in performing this sixth bending operation.

The seventh bending operation relates to the shaping of the loop and bringing of the coincident and parallel eyes close together and the formation of a short bend in the link at the bases of the eyes, so that the curled ends of the wire may be more completely interlocked with the body of the link and the wires forming the eyes caused to stand substantially parallel with each other. This seventh bending operation is controlled from two cams F F′, mounted on the shaft 3, said cams having grooves 93 94, within which project rolls 95 96, carried on the outer ends of horizontally-disposed levers 97 98, pivoted, respectively, at 99 100 to the bed 1.

101 102 are slides capable of moving freely within suitable ways in boxes 103 104, secured to the bed 1, and 105 106 are the tools which perform the seventh bending operation, which tools are secured within the slides 101 102, so as to be carried by the latter. These tools project toward each other beyond the slides and have in their opposed faces suitably-shaped recesses 107 108, as shown at Fig. 15, so that when these tools are forced against the eyes of the link said recesses will conform to the general shape of said eyes.

The inner ends of the levers 97 98 are loosely connected with the slides 101 102, as shown in dotted lines at Fig. 1, so that it will be readily understood that when said levers are caused to swing on their pivotal points by the action of the cams F F′ the slides 101 102 will be reciprocated toward and away from each other.

Figure 23:
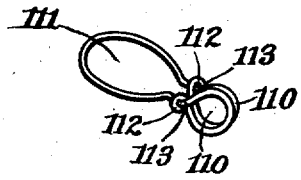

The several parts of the machine being in the position as shown at Fig. 15, with the partially-formed link within the tool 90 and around the mandrel 18, the cams F F′ act to throw the bending-tools 105 106 inward toward each other and against the eyes of the link, thus forcing them firmly together and bringing the loop snugly around the mandrel to finally complete the formation of the link, as shown at Figs. 16 and 23.

The link is now completely formed by the above-described seven bending operations, and the bending-tools 105 106 are not withdrawn by the action of the cams F F′, and the cam C operates to lower the gate 11 and withdraw the mandrel from the loop of the finished link, thus leaving the latter held by friction within the bending-recess in the tool 90. The operation of the cam C now retracts this tool 90 with the link carried therein until the eyes of the link are in alinement with the wire to be fed for a succeeding link, as shown at Fig. 4, and the wire-feeding instrumentalities then operate to feed the wire through the eyes of the previously-bent link for the purpose of forming a succeeding link, said cam causing the tool 90 to dwell in this position until said feeding has been accomplished. This cam C now causes the tool 90 to be completely withdrawn from the finished link, the latter being of course held by the blank for a succeeding link, and the finished link now drops by gravity into the well 109, through which the chain, as fast as it is made, passes to any suitable receptacle. This dwell referred to of the tool 90 extends throughout the period of time occupied in feeding the wire for a succeeding link, in cutting off such wire, and in performing thereon the first bending operation.

Referring particularly to Figs. 17 to 23, inclusive, these seven bending operations will be readily comprehended, and it will be observed that the sixth bending operation is so performed as to bring the ends of the wire within the loop with the extreme portions of said ends curled completely around the side wires of the loop at the bases of the eyes. In order that this link may be clearly identified as to the portions thereof which have heretofore been mentioned, I will designate the eyes as 110, the loop as 111, the curled ends as 112, and the short bends in the side wires of the loop and at the bases of the eyes as 113. These short bends 113 constitute a very good feature of the link, since they afford a recess within which the curled ends may be disposed, so that the eyes can be brought flat together and substantially parallel with each other, and for the further reason that they afford additional security and prevent the pulling out of the curled ends when the chain is subjected to great tensile strain.

In describing the various operations of the bending instrumentalities no mention has been made of any peculiar shape of the various cams or cam-surfaces; but the active and passive conditions of parts operatively connected with such cams or cam-surfaces have been assumed rather than explained in detail, since the cutting of a cam so as to produce reciprocatory movements or dwells in certain parts is a very simple matter, well understood, and does not require description. It will thus be seen that I employ in my machine eight cams for the purpose of feeding the wire and for forming the link, and that the several bending operations are performed by these cams at different times, so that each bending operation is separate and complete in itself.

Figure 17:
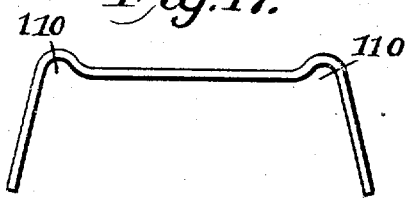
Figure 18:
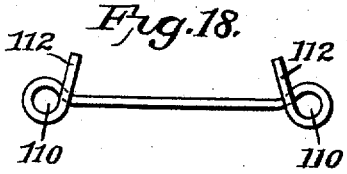
Figure 19:
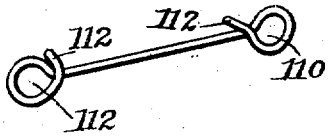
Figure 20:
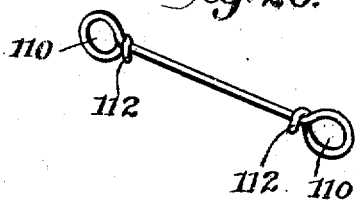
Figure 21:
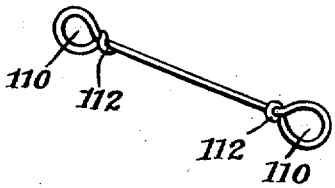

The operation of my improvement as constructed and working in accordance with the description heretofore given is as follows: Presupposing a link to have been completed and to have been held within the tool 90 in its partially-retracted position with the eyes of the finished link directly in line with the feed of the wire, as shown at Fig. 4, the cam A now operates to rock the shaft 47, whereby the crank 42 is operated to clamp the wire and throw the slide 39 inward, thereby projecting the wire through the eyes of said link and in position between the gates 9 and 11. The cam A then acts to release the wire and withdraw the slide 39. The cams B C next cause the gates 9 11 to approach each other, the lower gate being projected upward sufficient only to bring the studs 17 immediately beneath the wire, so that the latter will be in contact with said studs, while the upper gate is forced downward to an extent sufficient only to enable the tool 13 to cut off the wire blank while the latter is yet supported on said studs. After the blank has been severed it will rest upon the studs and will of course lie in the same horizontal plane in which it was originally fed. The lower gate is then projected upward still farther to force the studs 17 against the wire blank, thereby throwing the extremities of the latter up within the tools 12 13 to form a half-round and bending the extremities of the blank at an angle of about ninety degrees, as shown at Figs. 9 and 17. It will be observed that the body of the wire or that part which is subsequently bent to form the loop of the link is not displaced in the slightest from the horizontal plane in which the wire is fed into the machine. The cam B now operates to elevate the gate 9, so that the parts carried thereby will not stand in the way of the next operation. The cams E E′ now cause the clamping-rods 65 66 to be thrown against the studs to confine the wire as against displacement and also to bring into proper position the bending-tools 74 75, whereupon said tools are operated, by means of the cam D, to bend the ends of the wire completely around to form the circular eyes, as shown at Figs. 11 and 18. These bending-tools being notched, as previously set forth, are given an end thrust by means of the cam E′, whereby the ends of the wire are bent out of the vertical plane of the eyes and at right angles thereto across the bases of the latter, as shown at Figs. 12 and 19. The cams E E′ now operate to retract the clamping-rods and tools 74 75, and the gate 9 is then depressed by the action of the cam B, thereby bringing the bending-tools 15 down against the projecting ends of the wire to bend the latter still farther around the body of the blank, as shown at Figs. 13 and 20. The cam B now operates to elevate the gate 9 and to hold the latter in a position with the anvils 16 immediately in front of the studs, so as to confine the blank at the eyes thereof, and said cam, by reason of its operative connection with the tools 83 84, operates to force said tools against the projecting ends of the wire to finally and completely curl them around the body of the blank, as shown at Figs. 14 and 21. The operations of the cam B which control the movements of the gate 9 and the movements of the tools 83 84 are independently-acting surfaces, so that it will be readily understood that during the bending operation caused by one portion of this cam there will be no movement of the gate 9, which is controlled by the other portion of said cam. The cam B next operates to elevate the gate 9 to its uppermost position and also to withdraw the tools 83 84, and immediately following the cam C causes the tool 90 to be forced against the body of the link, thereby bending the same around the mandrel, which latter is held in position by the gate 9, as shown at Figs. 15 and 22. The cams F F′ next operate to throw the tools 105 106 against the completed eyes of the link, thus bringing them together and finally shaping the entire link, as shown at Figs. 16 and 23. The tools 105 106 are then withdrawn by the cams F F′, and the gate 11, which has during all these operations remained stationary in elevated position, is now depressed by the action of the cam C, thus withdrawing the mandrel from the loop of the finished link and leaving the latter contained within the tool 90, which previously operated to bend the blank around said mandrel. The cam C in its operations now causes this tool 90 to be drawn back, carrying with it the finished link until the eyes of the latter are directly in line of the line of feed of the wire, as shown in Fig. 4, whereupon said tool will remain in this position until the wire for a new link has been fed through the eyes of the previously bent and formed link and until said wire has been cut off and the first bending operation performed thereon by the joint action of the upper and lower gates 9 11, as before set forth. This cam C then operates to finally withdraw the tool 90, and the previously completely-finished link being now interlooped with the succeeding and partially-formed link, the completed link will withdraw from said tool and will remain suspended within the well through which the chain when completed passes.

A great many of the mechanisms herein shown and described may be changed, or other mechanisms well known to any ordinary mechanic may be substituted without departing from the spirit of my invention.

It will be clearly seen that by separating the several bending operations, so that they are performed successively and at different times, the work of the machine is greatly simplified, there can be no excessive strain upon the parts, the machine can be readily repaired, and interchangeable parts may be provided, so that, in fact, the output of the machine, its strength, and its actual running-time the year around are all far above the average output, strength, and running-time which have heretofore characterized machines of this description.

Having thus described my invention, what I claim as new, and desire to secure by Letters Patent, is—

1. The combination of means for feeding the wire, the upper press-gate carrying the tools for assisting to perform the first bending operation and means for cutting off the wire, the lower press-gate carrying the mandrel and the bending-studs, means for lowering the upper press-gate whereby the wire is cut off and said tools brought into close proximity with the wire blank, and means for elevating the lower gate whereby the bending-studs are forced upward against the wire blank until the axes of said studs are intersected by the axial line of feed of the wire, substantially as set forth.

2. The combination of the means for performing the first bending operation, with the rotatory shafts capable of a sliding movement, the longitudinally-movable clamping-rods concentric within said shafts, means for operating said rods independent of said shafts, the notched bending-tools carried eccentrically by said shafts, and means for moving said shafts forward and for subsequently revolving them whereby the side walls of said notched bending-tools are forced against the wire blank to perform the second bending operation, substantially as set forth.

3. The combination of means for performing the first bending operation, the notched bending-tools carried by rotatory shafts capable of a sliding movement, means for revolving said shafts after they have been partially projected whereby the second bending operation is performed, and means for still farther projecting the said shafts after the second bending operation whereby said tools are caused to perform the third bending operation, substantially as set forth.

4. The combination of means for performing the first bending operation, with the rotatory shafts capable of a sliding movement, the longitudinally-movable clamping-rods concentric within said shafts, means for operating said rods independent of said shafts, the notched bending-tools carried eccentrically by said shafts, means for moving said shafts forward and for subsequently revolving them whereby the side walls of said notched bending-tools are forced against the wire blank to perform the second bending operation, and means for still farther advancing said shafts after said operation, whereby the rear walls of said notched bending-tools are forced against the extremities of the wire to perform the third bending operation, substantially as set forth.

5. The combination of means for feeding the wire, the upper press-gate carrying the tools for assisting to perform the first bending operation and means for cutting off the wire, the lower press-gate carrying the mandrel and the bending-studs, means for operating said gates whereby the first bending operation is performed, the notched bending-tools carried by rotatory and sliding shafts whereby the second and third bending operations are performed, and the bending-tools carried by the upper press-gate whereby the fourth bending operation is performed, substantially as set forth.

6. The combination of the lower and upper press-gates carrying respectively the mandrel and bending-studs and the instrumentalities for performing the first and fourth bending operations, means for performing the second and third bending operations, the anvils depending from the upper press-gate, means for operating the latter to bring said anvils in front of said studs after the fourth bending operation, and the reciprocatory slide for performing the fifth bending operation, substantially as set forth.

7. The combination of the lower and upper press-gates carrying respectively the mandrel and bending-studs and the instrumentalities for performing the first and fourth bending operations, means for performing the second and third bending operations, the anvils depending from the upper press-gate, means for operating the latter to bring said anvils in front of said studs after the fourth bending operation, the reciprocatory slide for performing the fifth bending operation, means for elevating the upper press-gate after the fifth bending operation, the reciprocatory slide and means for driving the same against the wire blank, whereby the latter is bent into U shape around the mandrel and the sixth bending operation performed, substantially as set forth.

8. The combination of the rotary cams B, C, the press-gate 9 carrying the tools 12, 13, and 15, and anvils 16, the gate 11 carrying the mandrel and bending-studs 17, and connections between said cams and gates whereby the latter are operated, substantially as set forth.

9. In a machine for automatically making wire chain, the combination of the upper and lower press-gates supported by the bed of the machine and capable of vertical reciprocation toward and away from each other, means carried by the upper gate for cutting off the wire, tools carried by said gate and coöperating with bending-studs carried by the lower gate for imparting the initial bend to the wire blank, bending-tools carried upon rotatory and sliding shafts and eccentric thereto, means for carrying these tools across the ends of the partially-bent blank and for revolving said tools whereby eyes are formed at the ends of the blank, means for subsequently forcing said tools forward against the extremities of the wire whereby the latter is bent at right angles to the eyes and across the bases thereof, means carried by the upper press-gate for bending said extremities at right angles to the position last mentioned, anvils carried by the upper press-gate, bending-tools capable of sliding, means for forcing said tools against the extremities of the wire and for finally bending the same completely around the blank, the mandrel carried by the lower press-gate and means for bending the blank into U shape around said mandrel, and instrumentalities for finally shaping the link, substantially as set forth.

10. The combination of the head-block 39 capable of sliding in suitable horizontally-disposed ways in the bed and provided with vertical guideways, the bar 40 capable of sliding freely within said ways, the rock-shaft journaled within said block, eccentric connection between said shaft and bar whereby the rocking of the former will cause vertical reciprocation of the latter, and means for rocking said shaft, substantially as set forth.

11. The combination of the head-block 39 capable of sliding in suitable horizontally-disposed ways in the bed and provided with vertical guideways, the bar 40 capable of sliding freely within said ways, the rock-shaft journaled within said block, eccentric connection between said shaft and bar whereby the rocking of the former will cause the vertical reciprocation of the latter, the crank 42 secured to said shaft, the lever $43^a$ pivoted to the frame of the machine, the lever 45 connecting said lever and crank, the rock-shaft 47 journaled in the frame of the machine and carrying the crank 48, the link 49 connecting the crank 48 and lever $43^a$, the crank 50 secured on the shaft 47 and carrying at its extremity a roll 51, and the rotatory cam A having a groove 52 within which said roll projects, substantially as set forth.

12. In a machine for automatically making wire chain, the combination of the bed, the upright rising therefrom and having guideways, the gate within said ways and having a slot and capable of a vertical reciprocation, the rock-shaft journaled in said upright, means for rocking said shaft, the block within said slot and having a free movement therein, and the disk rigid on the inner end of said shaft and having a crank-stud projecting therefrom loosely within said block, substantially as set forth.

In testimony whereof I affix my signature in presence of two witnesses.

CHARLES F. SMITH.

Witnesses:
R. H. BRODERICK,
A. B. ALVORD.